United States Patent [19]

Holbrook

[11] 4,160,427
[45] Jul. 10, 1979

[54] AQUARIUM WATERFALL

[75] Inventor: Arthur J. Holbrook, Lynnfield, Mass.

[73] Assignee: Rolf C. Hagen (USA) Corp., Mansfield, Mass.

[21] Appl. No.: 870,950

[22] Filed: Jan. 20, 1978

[51] Int. Cl.² .................. A01K 63/00; A01K 64/00
[52] U.S. Cl. ........................................ 119/5; 40/406
[58] Field of Search .............. 119/5; 40/406, 407, 40/410, 409

[56] References Cited

U.S. PATENT DOCUMENTS

| | | | |
|---|---|---|---|
| 3,057,094 | 10/1962 | Winkelman | 119/5 X |
| 3,390,665 | 7/1968 | Wininger | 119/5 |

Primary Examiner—Russell R. Kinsey
Assistant Examiner—Daniel J. Leach
Attorney, Agent, or Firm—Wolf, Greenfield & Sacks

[57] ABSTRACT

An aquarium waterfall composed of a base, vertical member and cap and wherein a lift tube extends from the base to the cap. A sand reservoir is formed in the base. An air tube operatively connected to the lift tube causes water to rise in the lift tube, and the water carries sand with it from the base to the cap where the mixture of sand and water is redirected in a downward direction toward the base over outcroppings in the vertical member to simulate a waterfall.

10 Claims, 7 Drawing Figures

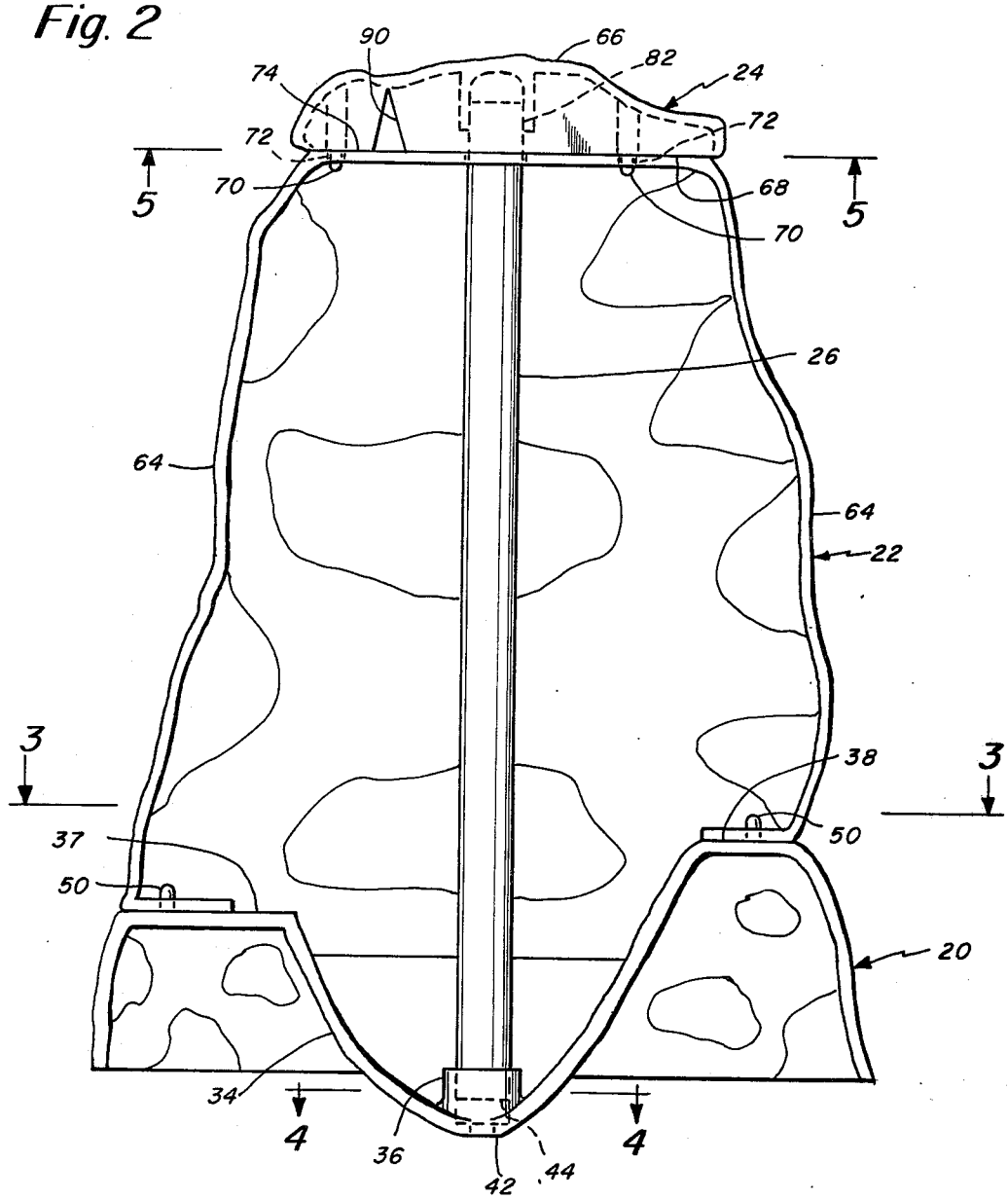
Fig. 2
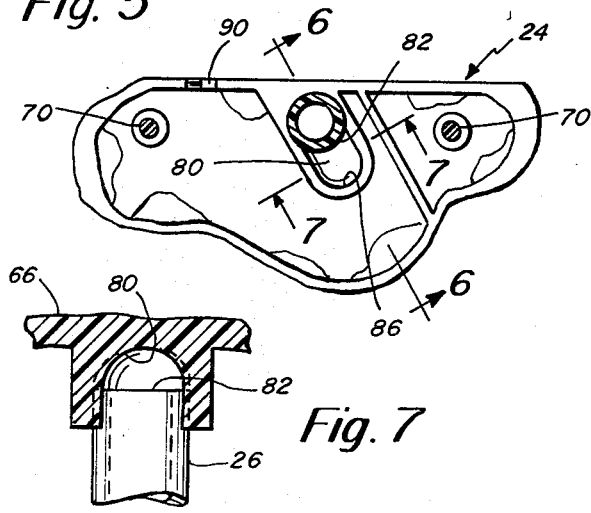
Fig. 5
Fig. 7
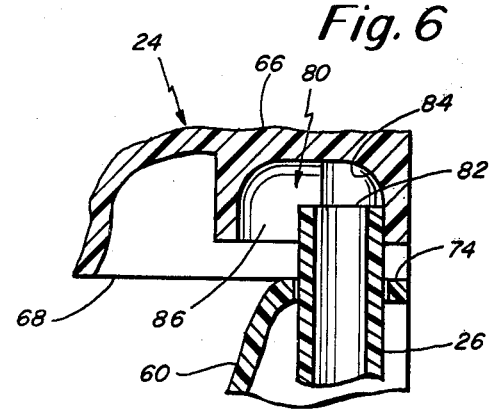
Fig. 6

AQUARIUM WATERFALL

This invention relates to aquarium ornaments and more particularly comprises a new and improved simulated waterfall designed to be mounted on the gravel bed of a home aquarium.

The prior art includes Winkelman U.S. Pat. No. 3,057,094 and Wininger U.S. Pat. No. 3,390,665. Each of these prior patents shows a waterfall ornament for aquariums, but each has limitations which limit their marketability and appeal. One important failing of each is the inclusion of certain unnatural structure which detracts from the appearance of the unit. In the Winkelman device, the waterfall includes a chamber within its cap that is quite unlike anything which appears in nature. There is nothing "natural" about the appearance of the Winkelman unit. The Wininger unit is somewhat more "real", but it includes a well at the top that may be seen from above and which collects the sand and water. In each unit, sand which simulates the falling water of the waterfall in the aquarium drops by gravity over the background structure, and there is little turbulence created to provide animation.

In accordance with the present invention, the waterfall is simulated by a directed flow of water and sand down a simulated cliff having several outcroppings that redirect the falling sand in a prescribed path to create maximum interest. There is no reservoir or other artificial collection point forming part of the waterfall at the top of the unit, which detracts from its appearance. And the force flow allows the unit to function with a minimum amount of sand.

BRIEF FIGURE DESCRIPTION

FIG. 2 is a rear elevation view of the simulated waterfall structure shown in FIG. 1;

FIGS. 3-5 are horizontal cross-sectional views taken along the corresponding section lines in FIG. 2;

FIGS. 6 and 7 are fragmentary cross-sectional views of the top portion or cap of the simulated waterfall taken on corresponding section lines in FIG. 5.

DETAILED DESCRIPTION

Figure 1:
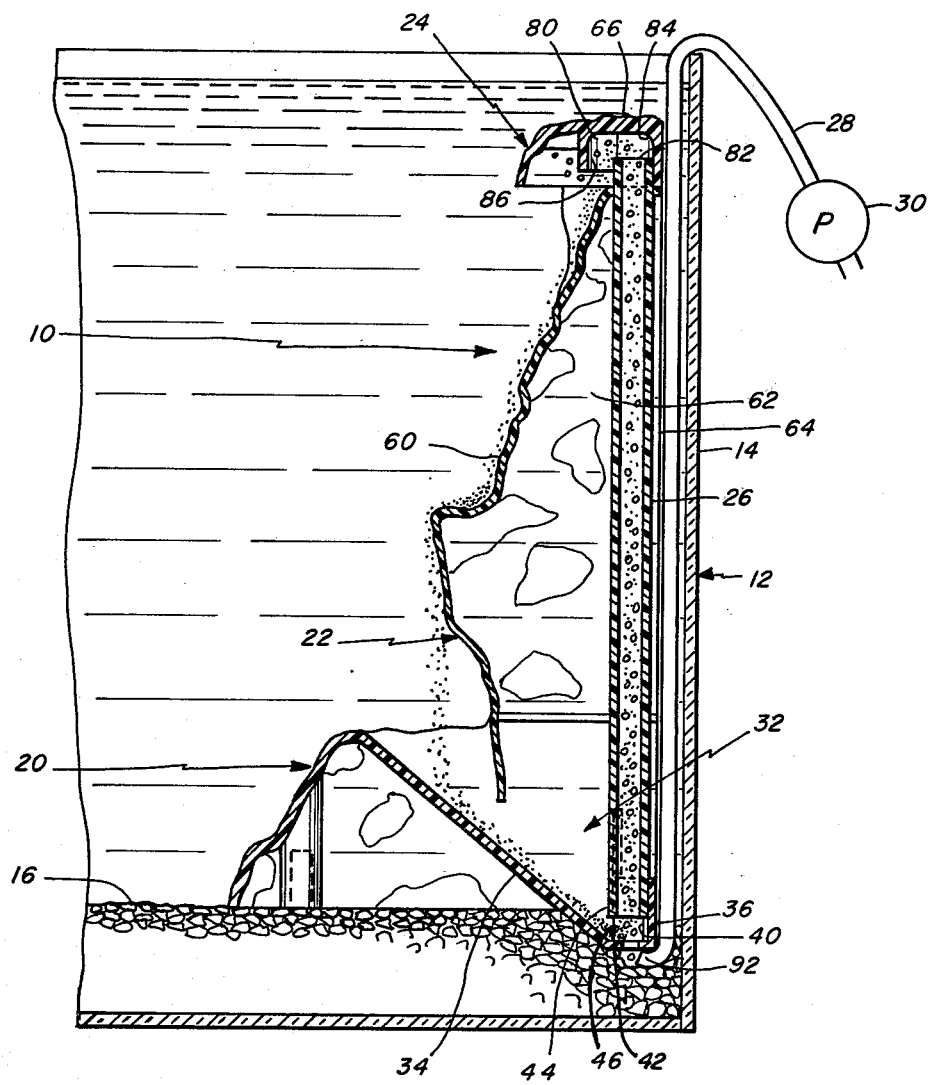
FIG. 1 is a side elevation view of a simulated waterfall mounted in an aquarium.

In FIG. 1, the aquarium waterfall of this invention generally designated with reference character 10 is shown mounted in an aquarium 12 close to the rear wall 14, seated on the gravel bed 16 and completely submerged in the aquarium water. The waterfall 10 is composed of three major molded elements, namely, base 20, vertical member 22 and cap 24. The assembly also includes a lift tube 26 which extends from base 20 to cap 24 along with an air hose 28 and pump 30.

Figure 3:
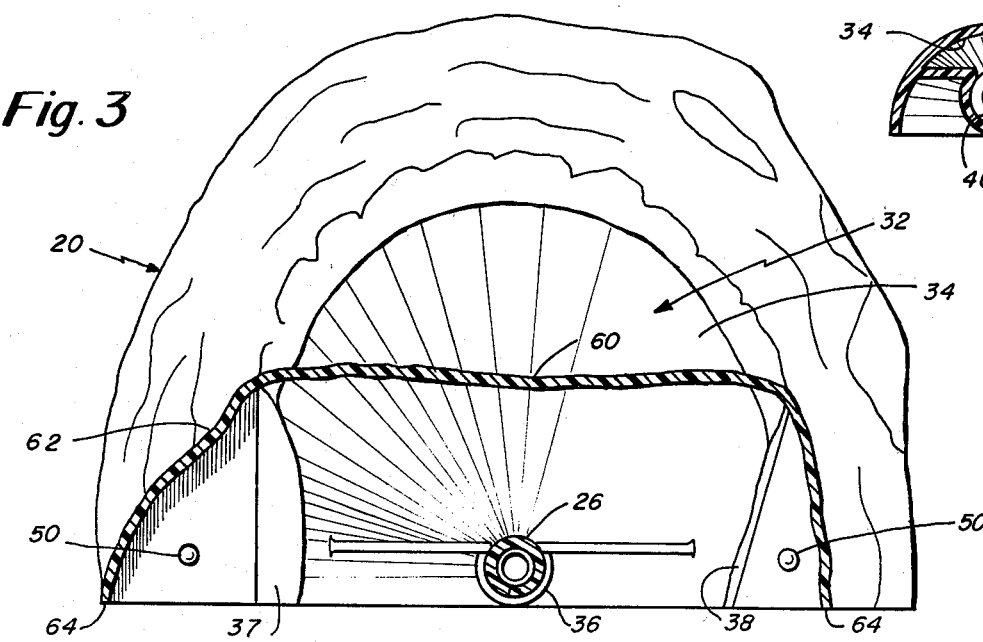
Figure 4:
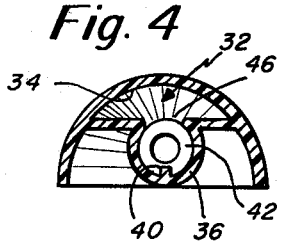

The base 20, vertical member 22 and cap 24 need not be made of very heavy stock but they must of course possess sufficient rigidity to maintain the three parts when assembled in the arrangement shown in the drawing. Typically they may be molded of styrene or other inexpensive plastic materials. Base 20 simulates a rock formation adjacent the bottom of the aquarium and is provided with a well 32 in its upper surface having a bottom wall 34 that extends generally downwardly in a rearward direction to a socket 36 that may be molded as an integral part of the base and which receives the lower end of the lift tube 26. The side portions of the upper surface of base 20, as suggested at 37 and 38 in FIGS. 2 and 3, are flat to provide a support for the vertical member 22. The socket 36 which receives the lower end of the lift tube 26 is open in a forward direction to the well 32 as shown in FIG. 1, and the base of the socket carries a stop 40 which prevents the lift tube from being inserted in the socket to a depth wherein it reaches to the bottom wall 42. Thus, the lower end 44 of lift tube 26 is elevated from the bottom of the base to allow communication between the open front 46 of socket 36 and the bottom of the tube.

The flat surfaces 37 and 38 which support the vertical member 22 carry pins 50 that register with holes in the bottom of the vertical member to hold the base and vertical member in rigid assembly. The vertical member 22 has a front surface 60 that simulates a rock formation as the front wall of the waterfall. A number of outcropping formations extend forward from the wall, which create a tumbling action for the waterfall display described in greater detail below. The vertical member 22 has sides 62 that extend rearwardly so that its edges 64 may be positioned against or closely adjacent the vertical wall 14 of the aquarium. The vertical member 22 encloses the lift tube 26 behind the front surface 60 and within the sides 62 so that it is not visible from the front of the aquarium.

Cap 24 as shown in the drawing is appreciably smaller than the base 20, and its top surface 66 also simulates a rock formation. A pair of pins 70 in the lower surface 68 of cap 24 extend downwardly into holes 72 formed in the upper surface 74 of the vertical member so as to secure the cap and vertical member together.

An inverted U-shaped trough 80 is formed in the under surface 68 of cap 24, (see FIGS. 5-7) and when the cap is assembled on vertical member 22, the upper end 82 of the lift tube is disposed in the rear portion 84 of the trough. The trough extends generally forwardly from its rear portion 84 at an angle of approximately 75° to the rear wall 14 of the aquarium, and the forward end 86 of the trough serves as a baffle to direct the discharge from the lift tube in a downwardly direction. The forward or discharge end 86 of the trough is disposed forward of the front surface 60 of vertical member 22 so that the discharge of tube 26 essentially is directed downwardly over the outer surface 60 of the vertical member. A slot 90 (see FIGS. 2 and 5) is provided in the rear of cap 24 to allow air which is discharged from the lift tube to escape from beneath the cap and reach the surface of the water in the aquarium. The slot 90 is remote from the discharge end of the trough for reasons which will become apparent below.

The air tube 28 connected to pump 30 extends over the wall 14 to the bottom of the aquarium, and has its discharge end 92 disposed immediately beneath the socket 36 in the base, which supports lift tube 26. Therefore, when the pump 30 is activated, air driven dowardly in the air tube 28, which discharges from the end 92 rises into lift tube 26. It is essential for the operation of the device that the air discharged from outlet end 92 of the air tube rise into the lift tube.

A fine grade of sand having a particle size of approximately 0.04" in diameter is used in device to simulate the falling water of the waterfall over the front surface 60 of vertical member 22. Operation is initiated by placing the fine sand in the well 32 in base member 20. When the pump 30 is activated, air is discharged from the hose 28 into the lift tube 26, and the rising air bubbles entrain water upwardly in tube 26, in the conventional manner of a lift tube and the water in turn carries some of the fine sand with it. The mixture of air, water and sand flows upwardly in the lift tube 26 into the inlet end 84 of the inverted U-shaped trough 80 in cap 24. The mixture, by virtue of the shape of the trough is turned forwardly in the trough where it flows toward the baffle or forward end of the trough. The end 86 of the trough in turn redirects the discharged mixture of air, water and sand in a downward direction over the front face 60 of the vertical member 22. The air of course which rises in the water after leaving the trough 80 flows under the body of the cap to the slot 90. At the slot the air escapes from beneath the cap and rises as bubbles to the surface of the water in the aquarium. The mixture of sand and water which discharges from the trough in a downward direction over the front face of the vertical member tumbles over the out-croppings in the front surface 60, and the falling sand particles optically give the illusion of a substantial flow while in fact only a small quantity of sand actually moves in the system. The sand which falls down the front face of the vertical member 22 is captured in the well 32 in the base, and the inclined wall 34 in turn causes the sand to flow toward the open face 46 of socket 36 so that it may readily be picked up again by the rising water and air in the bottom end of the lift tube. Approximately ¼ teaspoon of sand is sufficient to create the desired effect.

Unlike other systems, the discharged mixture of sand and water leaving the trough 80 in cap 24 is driven downwardly in the aquarium over the front face 60 of the vertical member 22, and the sand is dependably recaptured in the trough 32 in the base. The forced flow of water in a downward direction creates some turbulence of the water to create greater animation. The particles of sand do not merely fall by gravity over the out-croppings of rock in the surface 60 but are rather accelerated in a downward direction at the baffle end of the trough. There is an absence of any reservoir or other unnatural formation incorporated into the visible portion of the waterfall so as to preserve the natural appearance of the ornament, unlike the aquarium waterfalls shown in the Winkelman and Wininger U.S. Pat. Nos. 3,057,094 and 3,390,665.

Because numerous modifications may be made of this invention without departing from its spirit, it is not intended that the scope of this invention be limited to the specific embodiment illustrated and described. Rather, it is intended that the scope of this invention be determined by the appended claims and their equivalents.

What is claimed is:

1. An aquarium waterfall comprising
   a base having a well for collecting sand particles,
   a vertical member secured to the base and having an outer surface that simulates a generally vertical rock formation over which water may fall,
   a lift tube secured to the base and having an opening at the lowest portion of the well and adapted to accept sand particles from the well,
   a pump and air hose mounted on the aquarium with the discharge end of the hose positioned to discharge air into the bottom of the lift tube,
   a cap secured to the top of the vertical member and having an inverted trough on its lower surface with a discharge end positioned over and in front of the forward face of the vertical member, the upper end of the lift tube discharging into the inverted trough,
   and a baffle at the discharge end of the inverted trough to direct the discharge of the lift tube downwardly over the face of the vertical member into the well in the base.

2. An aquarium waterfall as defined in claim 1 further characterized by
   said base and said cap being separable from the vertical member.

3. An aquarium waterfall as defined in claim 1 further characterized by
   said lift tube being disposed behind the vertical member.

4. An aquarium waterfall as defined in claim 3 further characterized by
   a socket in the base for supporting the lift tube,
   and an opening in the socket at the lowest point in the well in the base enabling sand in the well to enter the bottom of the lift tube.

5. An aquarium waterfall comprising
   a base having a well therein for collecting sand particles,
   a vertical member secured to the base and having an outer surface that simulates a generally vertical land formation over which water may fall,
   a lift tube secured to the base and having an opening at the lowest portion of the well and adapted to accept sand particles from the well,
   a pump and air hose mounted on the aquarium with the discharge end of the hose positioned to discharge air into the bottom of the lift tube,
   a cap mounted above the discharge end of the tube against which water and sand from the tube is discharged for turning the water and sand forwardly in front of the formation,
   and baffle means secured to the cap for redirecting water and sand discharged from the lift tube downwardly over the outer surface of the vertical formation.

6. An aquarium waterfall as defined in claim 5 further characterized by
   said cap and baffle means turning the water and sand discharged from the tube 180°, downwardly over the surface of the vertical member.

7. An aquarium waterfall comprising
   a base having a well therein for collecting sand particles,
   a vertical member secured to the base and having an outer surface that simulates a generally vertical rock formation over which water may fall,
   a lift tube secured to the base and having an opening at the lowest portion of the well and adapted to accept sand particles from the well,
   a pump and air hose mounted on the aquarium with the discharge end of the hose positioned to discharge air into the bottom of the lift tube,
   baffle means disposed over the upper end of the lift tube for redirecting water and sand discharged from the lift tube over the outer surface of the vertical member, and
   a cap secured to the top of the vertical member, said baffle means being formed in the bottom of the cap.

8. An aquarium waterfall as defined in claim 7 further characterized by
   means releasably securing the cap and base to the vertical member.

9. An aquarium waterfall as defined in claim 8 further characterized by
   means formed in the cap enabling air to escape from beneath the cap and rise in the form of bubbles to the surface of water in the aquarium.

10. An aquarium waterfall as defined in claim 7 further characterized by
    means securing the upper end of the lift tube in baffle means in the cap.

* * * * *